United States Patent [19]

Primm

[11] Patent Number: 5,554,828
[45] Date of Patent: Sep. 10, 1996

[54] INTEGRATION OF PEN-BASED CAPABILITY INTO A FIELD EMISSION DEVICE SYSTEM

[75] Inventor: Charles E. Primm, Plano, Tex.

[73] Assignee: Texas Instruments Inc.

[21] Appl. No.: 367,558

[22] Filed: Jan. 3, 1995

[51] Int. Cl.⁶ .................................................. G08C 21/00
[52] U.S. Cl. ............................ 178/18; 345/173; 313/496
[58] Field of Search ................................ 178/18, 19, 70; 345/104, 173, 174, 156; 313/309, 336, 351, 495, 496

[56] References Cited

U.S. PATENT DOCUMENTS

| | | | |
|---|---|---|---|
| 3,755,704 | 8/1973 | Spindt et al. | 313/309 |
| 4,523,654 | 6/1985 | Quayle et al. | 178/19 |
| 4,600,807 | 7/1986 | Kable | 178/19 |
| 4,649,232 | 3/1987 | Nakamura et al. | 178/18 |
| 4,650,926 | 3/1987 | Nakamura et al. | 178/18 |
| 4,665,283 | 5/1987 | Kable et al. | 178/19 |
| 4,771,276 | 9/1988 | Parks | 178/18 |
| 4,853,493 | 8/1989 | Schlosser et al. | 178/18 |
| 4,857,799 | 8/1989 | Spindt et al. | 313/495 |
| 4,893,115 | 1/1990 | Blanchard | 345/173 |
| 4,940,916 | 7/1990 | Borel et al. | 313/306 |
| 5,194,780 | 3/1993 | Meyer | 315/169.3 |
| 5,225,820 | 7/1993 | Clerc | 340/752 |
| 5,475,280 | 12/1995 | Jones et al. | 313/309 |

Primary Examiner—Wellington Chin
Assistant Examiner—Paul Loomis
Attorney, Agent, or Firm—Rose Alyssa Keagy; Richard L. Donaldson

[57] ABSTRACT

A field emission device pen-based system comprising a pen stylus 20 and a field emission device having a cathode 2 coupled to an anode 1, row and column drivers 68 and 66 coupled to the cathode and to a controller 64, row and column lines 96 and 98 respectively coupled to the row and column drivers 68 and 66, and receive circuitry 81 and 91 coupled to the controller 64 and to the row and column lines 96 and 98; wherein the row and column drivers 68 and 66 send a pulse on the row and column lines 96 and 98 in response to an input signal from the controller 64, and the receive circuitry 81 and 91 receive a pulse from the stylus on the row and column lines 98 and 96. The receive circuitry 81 and 91 send an output signal to the controller 64 responsive to the received pulses and the controller 64 determines the x–y location of the stylus 20 based on that output signal.

26 Claims, 4 Drawing Sheets

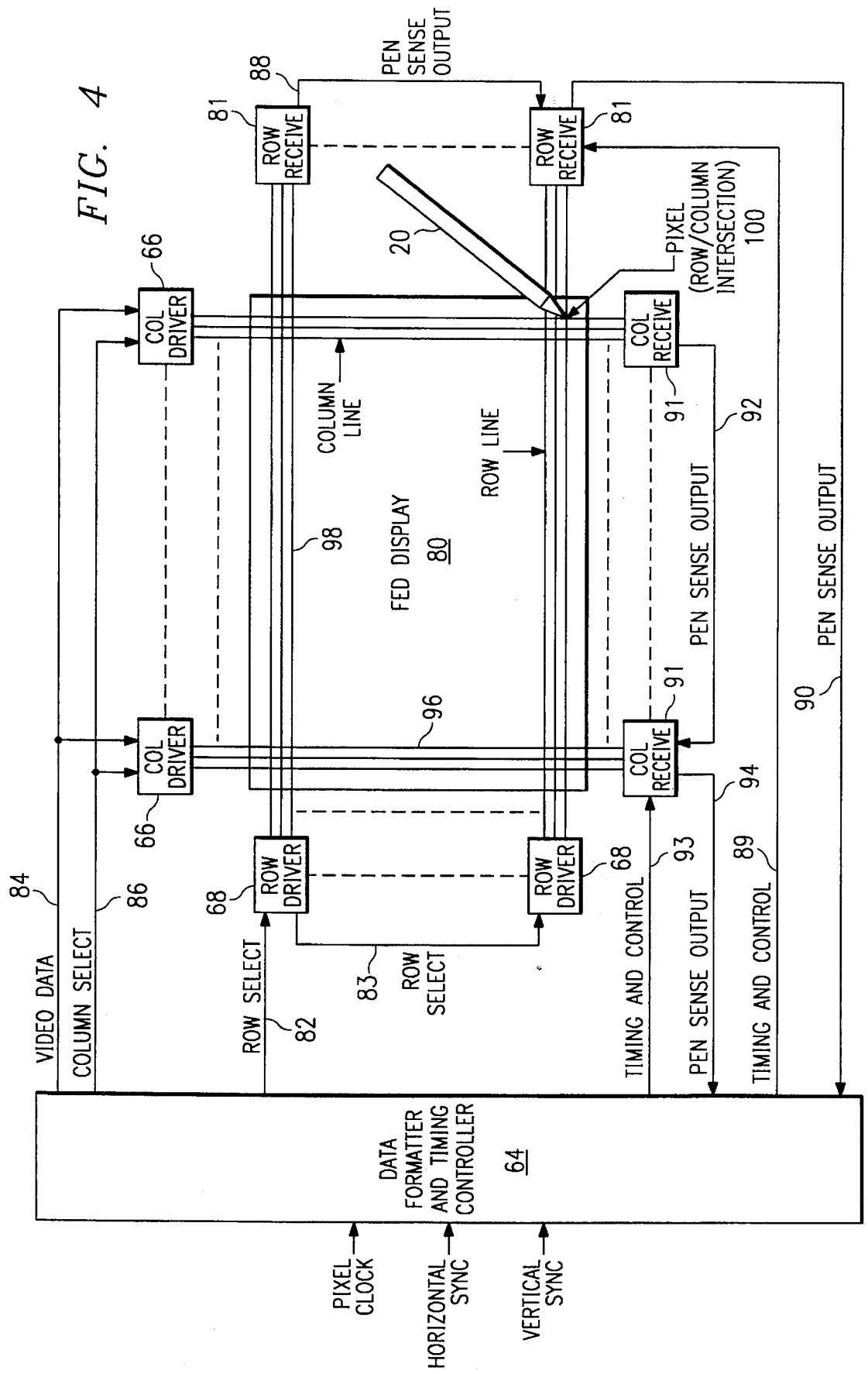

INTEGRATION OF PEN-BASED CAPABILITY INTO A FIELD EMISSION DEVICE SYSTEM

TECHNICAL FIELD OF THE INVENTION

The present invention relates generally to field emission devices ("FED") and, more particularly, to the integration of pen computing capability into an field emission device system.

BACKGROUND OF THE INVENTION

The phenomenon of field emission was discovered in the 1950's, and extensive research by many individuals, such as Charles A. Spindt of SRI International, has improved the technology to the extent that its prospects for use in the manufacture of inexpensive, low-power, high-resolution, high-contrast, full-color flat displays appear to be promising. Advances in field emission display technology are disclosed in U.S. Pat. No. 3,755,704, "Field Emission Cathode Structures and Devices Utilizing Such Structures," issued 28 Aug. 1973, to C. A. Spindt et al.; U.S. Pat. No. 4,940,916, "Electron Source with Micropoint Emissive Cathodes and Display Means by Cathodoluminescence Excited by Field Emission Using Said Source," issued 10 Jul. 1990 to Michel Borel et al.; U.S. Pat. No. 5, 194,780, "Electron Source with Microtip Emissive Cathodes," issued 16 Mar. 1993 to Robert Meyer; and U.S. Pat. No. 5,225,820, "Microtip Trichromatic Fluorescent Screen," issued 6 Jul. 1993, to Jean-Frédéric Clerc. These patents are incorporated by reference into the present application.

A FED flat panel display arrangement is disclosed in U.S. Pat. No. 4,857,799, "Matrix-Addressed Flat Panel Display," issued Aug. 15, 1989, to Charles A. Spindt et al., incorporated herein by reference. This arrangement includes a matrix array of individually addressable light generating means of the cathodoluminescent type having electron emitting cathodes combined with an anode which is a luminescing means of the CRT type which reacts to electron bombardment by emitting visible light. Each cathode is itself an array of thin film field emission cathodes on a backing plate, and the luminescing means is provided as a phosphor coating on a transparent face plate which is closely spaced to the cathodes.

The emitter backing plate disclosed in the Spindt et al. ('799) patent includes a large number of vertical conductive cathode electrodes which are mutually parallel and extend across the backing plate and are individually addressable. Each backing plate includes a multiplicity of spaced-apart electron emitting tips which project upwardly from the vertical cathode electrodes on the backing plate and therefore extend perpendicularly away from the backing plate. An electrically conductive gate electrode arrangement is positioned adjacent to the tips to generate and control the electron emission. The gate electrode arrangement comprises a large number of individually addressable, horizontal electrode stripes which are mutually parallel and extend along the backing plate orthogonal to the cathode electrodes, and which include apertures through which emitted electrons may pass. Each gate electrode is common to a full row of pixels extending across the front face of the backing plate and is electrically isolated from the arrangement of cathode electrodes. The emitter back plate and the anode face plate are parallel and spaced apart.

The anode is a thin film of an electrically conductive transparent material, such as indium tin oxide, which covers the interior surface of the face plate. Deposited onto this metal layer is a luminescent material, such as phosphor, that emits light when bombarded by electrons.

The array of emitting tips are activated by addressing the orthogonally related cathode gate electrodes in a generally conventional matrix-addressing scheme. The appropriate cathode electrodes of the display along a selected stripe, such as along one column, are energized while the remaining cathode electrodes are not energized. Gate electrodes of a selected stripe orthogonal to the selected cathode electrode are also energized while the remaining gate electrodes are not energized, with the result that the emitting tips of a pixel at the intersection of the selected cathode and gate electrodes will be simultaneously energized, emitting electrons so as to provide the desired pixel display.

The Spindt et al. patent teaches that it is preferable that an entire row of pixels be simultaneously energized, rather than energization of individual pixels. According to this scheme, sequential lines are energized to provide a display frame, as opposed to sequential energization of individual pixels in a raster scan manner.

The Clerc ('820) patent discloses a trichromatic field emission flat panel display having a first substrate comprising the cathode and gate electrodes, and having a second substrate facing the first, including regularly spaced, parallel conductive stripes comprising the anode electrode. These stripes are alternately covered by a first material luminescing in the red, a second material luminescing in the green, and a third material luminescing in the blue, the conductive stripes covered by the same luminescent material being electrically interconnected.

Today, a conventional FED is manufactured by combining the teachings of many practitioners, including the teachings of the Spindt et al. ('799) and Clerc ('820) patents. Referring initially to FIG. 1, there is shown, in cross-sectional view, a portion of an illustrative field emission device in which the present invention may be incorporated. In this embodiment, the field emission device comprises an anode plate 1 having an electroluminescent phosphor coating 3 facing an emitter plate 2, the phosphor coating 3 being observed from the side opposite to its excitation.

More specifically, the field emission device of FIG. 1 comprises a cathodoluminescent anode plate 1 and an electron emitter (or cathode) plate 2. A cathode portion of emitter plate 2 includes conductors 9 formed on an insulating substrate 10, an electrically resistive layer 8 which is formed on substrate 10 and overlaying the conductors 9, and a multiplicity of electrically conductive microtips 5 formed on the resistive layer 8. In this example, the conductors 9 comprise a mesh structure, and microtip emitters 5 are configured as a matrix within the mesh spacings. Microtips 5 take the shape of cones which are formed within apertures through conductive layer 6 and insulating layer 7.

A gate electrode comprises the layer of the electrically conductive material 6 which is deposited on the insulating layer 7. The thicknesses of gate electrode layer 6 and insulating layer 7 are chosen in such a way that the apex of each microtip 5 is substantially level with the electrically conductive gate electrode layer 6. Conductive layer 6 may be in the form of a continuous layer across the surface of substrate 10; alternatively, it may comprise conductive bands across the surface of substrate 10.

Anode plate 1 comprises a transparent, electrically conductive film 12 deposited on a transparent planar support 13, such as glass, which is positioned facing gate electrode 6 and parallel thereto, the conductive film 12 being deposited on the surface of the glass support 13 directly facing gate electrode 6. Conductive film 12 may be in the form of a continuous layer across the surface of the glass support 13; alternatively, it may be in the form of electrically isolated stripes comprising three series of parallel conductive bands across the surface of the glass support 13, as shown in FIG. 1 and as taught in U.S. Pat. No. 5,225,820, to Clerc. By way of example, a suitable material for use as conductive film 12 may be indium-tin-oxide (ITO), which is optically transparent and electrically conductive. Anode plate 1 also comprises a cathodoluminescent phosphor coating 3, deposited over conductive film 12 so as to be directly facing and immediately adjacent gate electrode 6. In the Clerc patent, the conductive bands of each series are covered with a particulate phosphor coating which luminesces in one of the three primary colors, red, blue and green $3_R$, $3_B$, $3_G$.

Selected groupings of microtip emitters 5 of the above-described structure are energized by applying a negative potential to cathode electrode 9 relative to the gate electrode 6, via voltage supply 19, thereby inducing an electric field which draws electrons from the apexes of microtips 5. The potential between cathode electrode 9 and gate electrode 6 is approximately 70–100 volts. The freed electrons are accelerated toward the anode plate 1 which is positively biased by the application of a substantially larger positive voltage from voltage supply 11 coupled between the cathode electrode 9 and conductive film 12 functioning as the anode electrode. The potential between cathode electrode 9 and anode electrode 12 is approximately 300–800 volts. Energy from the electrons attracted to the anode conductive film 12 is transferred to particles of the phosphor coating 3, resulting in luminescence. The electron charge is transferred from phosphor coating 3 to conductive film 12, completing the electrical circuit to voltage supply 11. The image created by the phosphor stripes is observed from the anode side which is opposite to the phosphor excitation, as indicated in FIG. 1.

It is to be noted and understood that true scaling information is not intended to be conveyed by the relative sizes and positioning of the elements of anode plate 1 and the elements of emitter plate 2 as depicted in FIG. 1. For example, in a typical FED shown in FIG. 1 there are approximately one hundred arrays 4, of microtips and there are three color stripes $3_R$, $3_B$, $3_G$ per display pixel.

The process of producing each frame of a display using a typical trichromatic field emission display includes a) applying an accelerating potential to the red anode stripes while sequentially addressing the gate electrodes (row lines) with the corresponding red video data for that frame applied to the cathode electrodes (column lines); b) switching the accelerating potential to the green anode stripes while sequentially addressing the rows lines for a second time with the corresponding green video data for that frame applied to the column lines; and c) switching the accelerating potential to the blue anode stripes while sequentially addressing the row lines for a third time with the corresponding blue video data for that frame applied to the column lines. This process is repeated for each display frame.

Pen-based computer systems are computer systems which use an electronic pen or stylus, instead of, or in addition to, a keyboard, to enter data and to control various computer functions, by writing, sketching, and pointing, directly on the computer display. The computer systems which utilize pen-based technology may be portable, e.g. battery-operated and less than four pounds; they may be desktop, e.g. AC-powered and transportable but not designed to operate while being moved; and they may be terminal-based, e.g. used as a terminal in communicating with a mainframe computer on a network or via a modem.

The portable market segment is targeting forms entry applications for inventory, insurance, delivery vehicles, field service, nursing/healthcare, law enforcement, and industries where workers are accustomed to filing in forms on a clipboard. Desktop systems are targeted at executives, stock brokers, business, and office automation. The terminal based market includes factory automation, industrial control, and point-of-sale.

There are basically four pen-input technologies used in pen-based computers: 1) a direct contact, resistive technology with indium-tin oxide deposited on the top surface of the anode glass support 13 of the field emission device display, 2) a wire grid construction implemented in indium-tin oxide coating which is located on a multi-layer glass assembly placed on top of the anode, 3) a conventional wire-grid electromagnetic digitizer placed underneath the field emission device display, and 4) a position responsive surface or digitizer having writing surfaces formed of a continuous resistive material located on a supportive substrate such as glass or plastic placed on top of the display. The stylus used in these systems may be corded or cordless.

The first technology, direct-contact resistive, is an adaptation of an older touch screen technology and requires that the indium-tin oxide coating be placed on the top surface of the FED anode glass support 13 so that the stylus can directly contact the electrically active layer, a so-called "direct-contact" technology. It is well known that this method of construction is subject to scratches and wear during normal operation and will not meet the durability requirements of the computer products industry. A further drawback of the direct contact digitizer is that the system does not respond to the user until the stylus physically touches the screen, making cursor control more difficult for the user.

The second technology, while having good performance and durability, is considerably more complex and costly to implement. This is because the wire grid structure requires a minimum of two sheets of coated glass, the etching of high-tolerance "wires" in the indium-tin oxide coating, and a complex system of custom driver circuits attached to each row and column of the sensor grid.

The third technology, wire-grid electromagnetic, has implementation problems associated with the fact that the digitizer is located approximately one-half inch below the writing surface. Tooling costs are generally higher than that of other technologies. Each wire in the sensor grid (typically between 50 and 200 individual wires, or more for higher resolution systems) must be connected to an electronic controller circuit. Electromagnetic digitizers also typically require a plane of magnetic material behind the wire-grid sensor to shield the system from stray magnetic effects. The additional weight of the wire-grid digitizer underneath the display adds unnecessary weight to the unit.

The fourth technology, resistive layer type electrographic digitizers, also has many disadvantages. First, there are problems with erroneous position readings caused by stray capacitance. Since computer screens are rectangular and not square, the edge-to-edge resistances in the horizontal direction is not the same as in the vertical direction; therefore, the resolution of the system is not the same in both directions. Furthermore, resistive layer electrographic digitizers are sensitive to electrical interference from externally generated noise and hand effects.

FIG. 2 shows an example of how current pen-based technology is implemented in FED systems using the fourth method. The digitizer consists of a single substrate of soda-lime float glass 17 coated on the underneath surface with a single layer of indium-tin-oxide (ITO) 15. Plastic is sometimes laminated to the glass panel 17 for added strength. Digitizer circuitry 14 is mounted to the face of the flat panel display. Electrical connection to the ITO is made by a silver wiring pattern on the periphery of the glass. The controller 16 signals the digitizer circuitry 14 to generate a 100 kHz AC drive voltage. Analog switches distribute drive signals to the four corners of the resistive ITO layer, creating an AC voltage gradient which alternates between the x and y axis. The tip of stylus 20, located on the glass surface opposite the ITO, detects the local magnitude of the applied voltage gradient by AC capacitive coupling. Analog circuits (not shown) amplify and filter the AC position signals and convert them to digital coordinate data. The controller then sends the appropriate display data to the display driver 18 of the flat panel display 14.

All four of the pen-input technologies described above have resolution granularity problems, the detection grid and the video display more often than not do not map precisely to the same x,y location. For this reason, pen-input data that the digitizer reports must be calibrated to approximate the location of the video pixels viewed by the user. This calibration often makes correct recognition more difficult than it would be if the digitizer and the video display coordinates were precisely the same.

Another problem with all four of the pen-input technologies described above is that additional components must be added to the pen-based systems. Components such as a controller, converters, numerous switching circuits, and other supportive devices must be added to the system electronics. These additional components increase the complexity of the system, reduce system reliability, and increase system cost.

What is needed is an pen-based system that is integrated into and utilizes existing FED circuitry. More ideally, what is needed is a pen-based system which doesn't require calibration between the detection circuitry and the display pixel circuitry. Also what is needed is a pen-based system which is lower in cost and which consumes less power than current pen stylus technologies.

SUMMARY OF THE INVENTION

A field emission device pen-based system is comprised of a pen stylus and a field emission device having a cathode coupled to an anode. The field emission device also has row and column drivers coupled to the cathode and to a controller, row and column lines respectively coupled to the row and column drivers, and receive circuitry coupled to the controller and to the row and column lines. The row and column drivers send a pulse on the row and column lines in response to an input signal from the controller, and the receive circuitry receives a pulse from the stylus on the row and column lines. The receive circuitry sends an output signal to the controller responsive to the received pulses and the controller determines the x-y location of the stylus based on that output signal.

The use of the FED pen system, as disclosed here, has numerous advantages. First, pen capability is provided utilizing existing FED components. Therefore, savings in power consumption, cost, and size are realized. The reduction in power which is realized in the present invention is important because pen-based applications are most often used in environments which are remote from power supply sources. Thus the FED system is usually powered by a battery during pen operation, and only through the conservation of power can the operating life of the system be extended.

In addition, the present invention provides the technical advantage of eliminating the problem of trying to accurately align the x-y locations of a pen stylus detector grid to the true x-y pixel locations of the FED display. The use of the row and column lines of the FED display as the detector grid ensures the accurate determination of the stylus x and y coordinates and is essential to today's high resolution applications.

BRIEF DESCRIPTION OF THE DRAWINGS

The foregoing features of the present invention may be more fully understood from the following detailed description, read in conjunction with the accompanying drawings, wherein:

FIG. 4 is a block diagram of a portion of a field emission display electronics system of the present invention.

DETAILED DESCRIPTION

Figure 3:
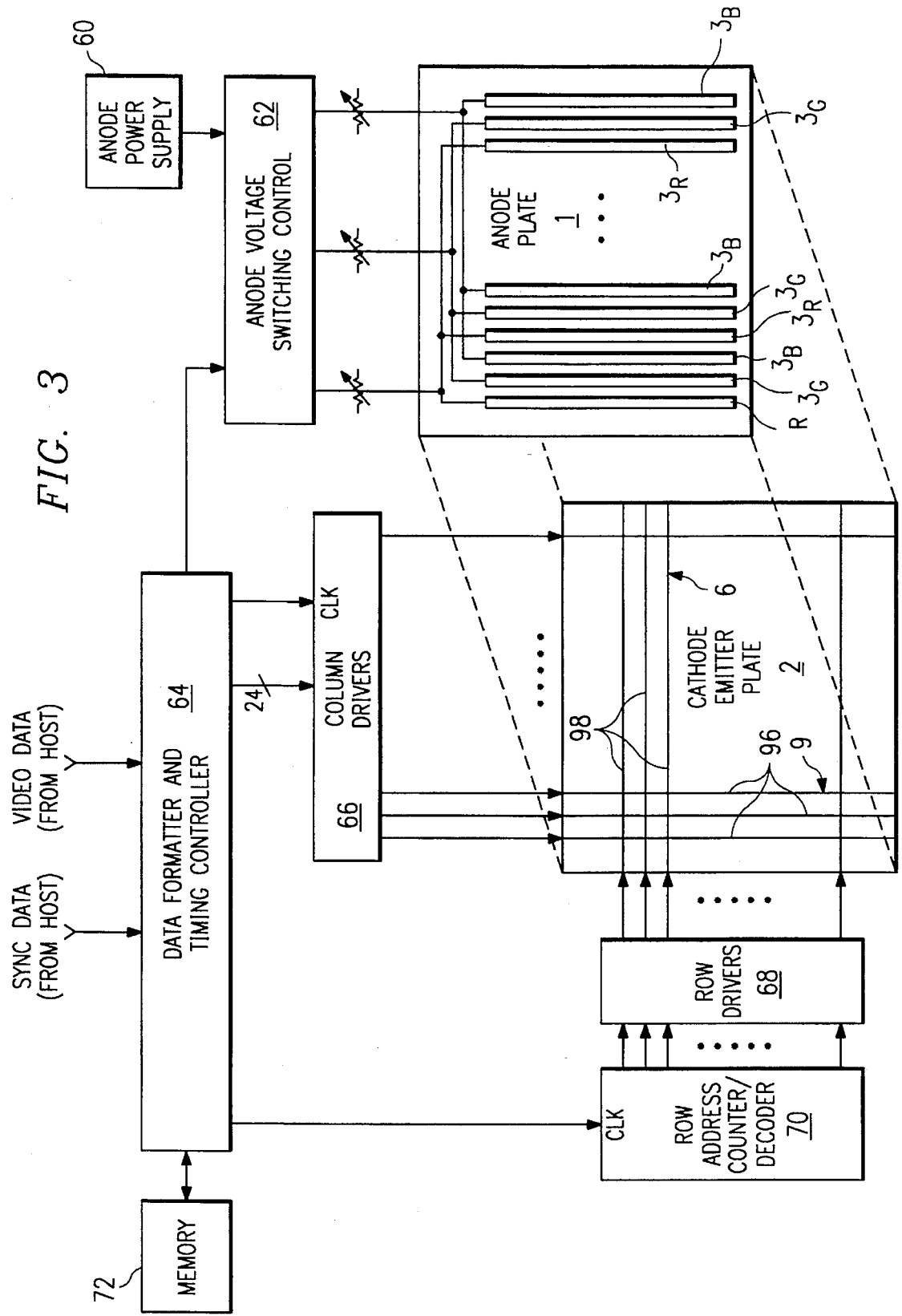
FIG. 3 is a block diagram of a portion of a field emission display electronics system.

FIG. 3 shows a block diagram of a portion of a field emission display electronics system as disclosed in U.S. patent application Ser. No. 08/332,182, "Field Emission Device Automatic Anode Voltage Adjuster," filed 31 Oct. 1994 (Texas Instruments, Inc. Docket No. TI-19620), incorporated herein by reference. As indicated in FIG. 3, anode plate 1 is physically located over emitter plate 2; however, anode plate 1 and emitter plate 2 are separated in the drawing in order to better show the elements comprising plates 1 and 2 of the FED display. Elements which are part of the system but which are unimportant to the understanding of the field emission display are not shown.

Anode power supply 60 provides a high voltage source to an anode switching control 62, typically between 300 and 800 volts. The anode voltage switching control 62, responsive to commands issued from data formatting and timing controller 64, provides voltages simultaneously (if the image is in monochrome) or sequentially (if the image is in color) to the three anode stripes $3_R$, $3_G$, and $3_B$, each of the anode stripe voltages being set to a level in accordance with the brightness characteristics of the corresponding luminescent material.

Figure 1:
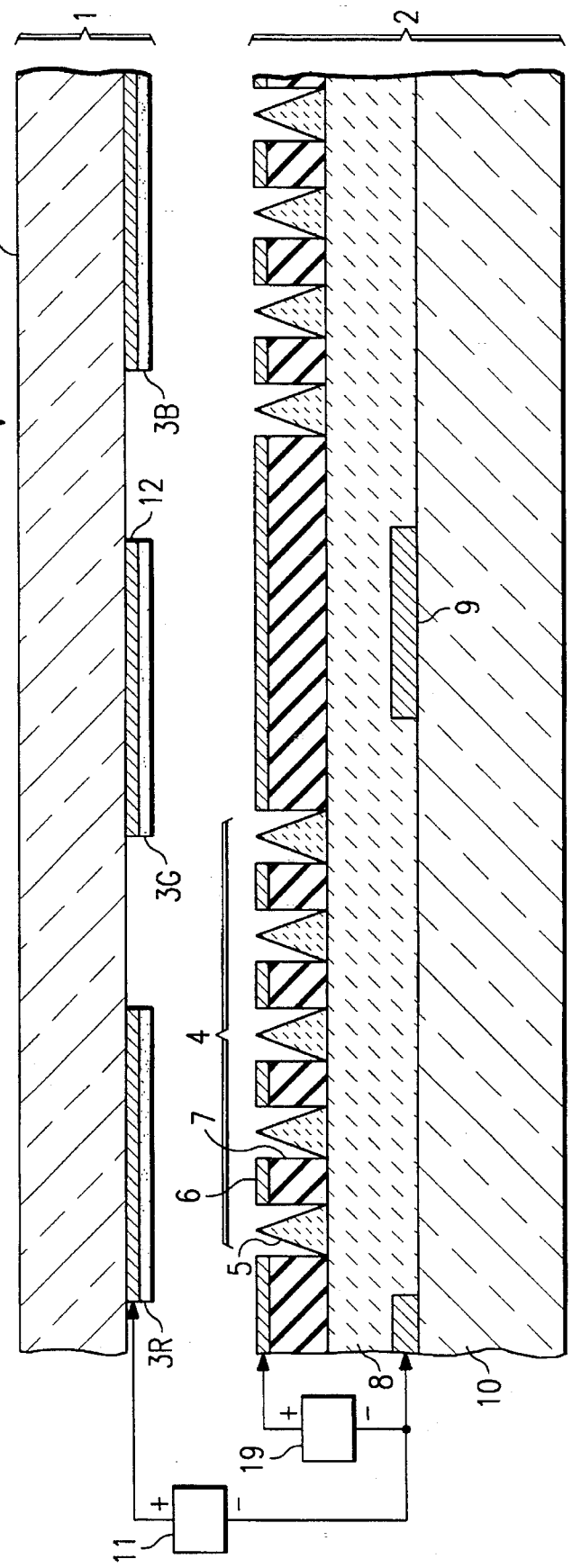
FIG. 1 is a cross-sectional view of a portion of a field emission device according to the prior art.
Figure 2:
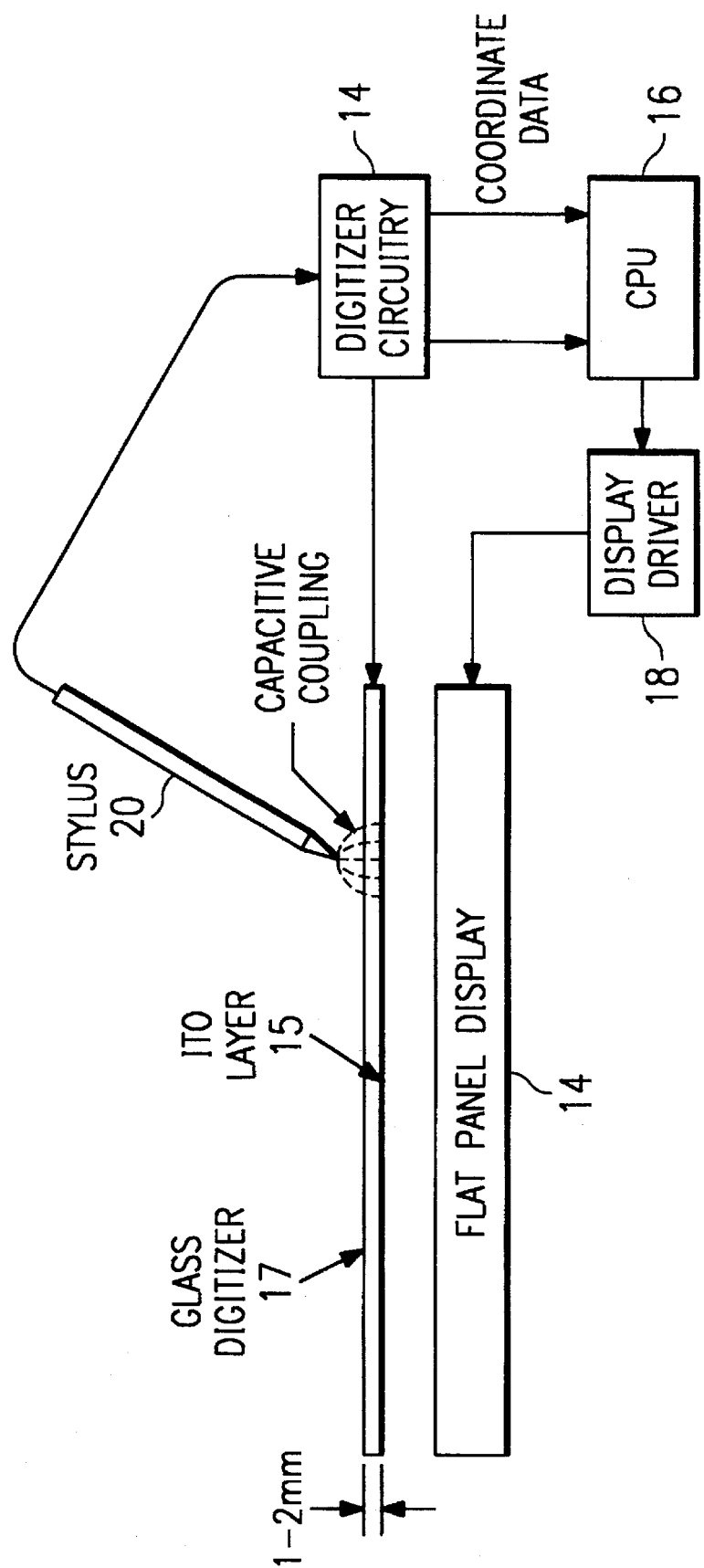
FIG. 2 is a plan view of a pen-based FED system according to the prior art.

The cathode electrodes 96 (column lines) of matrix-addressable cathode emitter plate 2 are individually coupled to column drivers 66. Cathode electrodes 96 are substantially similar to the cathode electrodes 9 of FIG. 1; however, the cathode electrodes 96 of the present invention perform an additional function not performed by the cathode electrodes 9 of prior art FIG. 1. The additional function performed by the cathode electrodes 96 is explained in more detail below. The column drivers 66 receive video data from a host device, which has been formatted by the data formatter and timing controller 64 into separate red, green, and blue display frames from an original mixed signal. In this example, the data formatter and timing controller 64 may process the video data according to the VGA standard, and may typically output data to the column drivers 66 for output on 640 parallel lines, to thereby provide one color component of a single row of the display. The data from the data formatter and timing controller 64 is latched into the column drivers 66 upon each occurrence of a clock signal received at the CLK input terminal.

The gate electrodes 98 (row lines) of matrix-addressable cathode plate 2 are individually coupled to row drivers 68. Gate electrodes 98 are substantially similar to the gate electrodes 6 of FIG. 1; however, the gate electrodes 98 of the present invention perform an additional function not performed by the gate electrodes 6 of prior art FIG. 1. The additional function performed by the gate electrodes 98 is explained in more detail below. The row drivers 68 receive enable signals from row address counter/decoder 70. The device 70 includes a counter which is responsive to each occurrence of a clock signal received at a CLK input terminal, and a decoder which applies an enabling signal sequentially to each of the row drivers 70. In this example, the counter of the device 70 may count to 480, the decoder portion of the device 70 applying enabling signals sequentially to each of the row drivers 68, to thereby address each of the 480 output lines.

The data formatter and timing controller 64 also receives a synchronization input signal from the host. The sync input contains the clock, horizontal sync, and vertical sync information.

The data formatter and timing controller 64 is coupled to frame memory 72. The memory 72 holds the luminance information corresponding to two red pixels, two green pixels and two blue pixels. For illustration purposes, memory 72 comprises 307,200 words of 12-bit length, which is the capacity necessary to store two full frames of six bits of luminance information for each pixel of a 640-column by 480-row display system.

In accordance with a field sequential mode of operation, an entire frame of red luminance information is first clocked out of the memory 72. After an entire frame of red luminance information has been transferred from the memory 72 a similar process is repeated for an entire frame of green luminance information, and thereafter for an entire frame of blue luminance information. This entire process is repeated continuously while an image is displayed by the FED.

FIG. 4 shows a block diagram of a portion of a field emission display electronics system according to the present invention. Elements shown in FIG. 3 which are not important to the understanding of the present invention are not shown in FIG. 4. As indicated in FIG. 4 and as stated earlier, anode plate 1 is physically located on top of cathode plate 2. The assembled FED anode plate 1 and cathode plate 2 is shown in FIG. 4 as FED display 80. Thus, FED display 80 includes anode plate 1 coupled to and on top of cathode plate 2.

A technical advantage of the present invention, as shown by FIG. 4 and described more fully below, is that FED pen capability can be realized without the addition of all of the extra components required by other pen-based systems. Instead of adding a separate pen subsystem, this invention utilizes existing FED components to provide the pen feature.

An additional technical advantage of the present invention, as described more fully below, is that cathode electrodes 96 and gate electrodes 98 perform a function not performed by typical cathode electrodes 9 and gate electrodes 6. Specifically, cathode electrodes 96 and gate electrodes 98 not only send pulses across the rows and column of FED display 80, but also receive pulses affected by the pen stylus.

During the active time in the present invention, enabling signals sent by the data formatter and timing controller 64 on line 82 are sequentially applied to each of the row drivers 68 on line 83. Enable signals are also sent by the data formatter and timing controller 64 to the column drivers 66 on line 86. Video data signals from the data formatter and timing controller 64 are transmitted on line 84 and then latched into the column drivers 66. During the non-active time between each frame, the data formatter and timing controller 64 generates pulses and sends these pulses on lines 82 and 86 to the row and column drivers 68 and 66. The pulse signals are then sent by the row and column drivers 68 and 66 to the row and column lines 98 and 96. In this manner, a pulse is sent to every row and column line 98 and 96. The pulses in the present invention are up to 30 volts on the column lines 98 and up to 80 volts on the row lines 96.

The pulses propagate through each row and column line 98 and 96 to row receive circuitry 81 and column receive circuitry 91. The row receive circuitry 81 and column receive circuitry 91 passively monitor the row and column lines 98 and 96 and therefore will sense the initial pulses sent by the row and column drivers 66 and 68. However, the row and column receive circuitry 81 and 91 will not send this information to the data formatter and timing controller 64. Instead the data formatter and timing controller 64 sends a first enable signal on line 93 to column receive circuitry 91 and a second enable signal on line 89 to row receive circuitry 81 which instructs the row and column receive circuitry 81 and 91 to monitor the row and column lines 98 and 96 for an echoed signal sent by pen 20 across the lines 98 and 96 which intersect at 100. The stylus is a standard pen stylus whose operation is described in more detail below.

The row and column lines 98 and 96 transmit the pulses from the row and column drivers 68 and 66 and also receive pulses reflected back from the stylus in a manner described more fully below. The stylus row position data is received by the row receive circuitry 81 and serialized on line 88 so that it can be sent by only one line, line 90, to the data formatter and timing controller 64. The stylus column position data is received by the column receive circuitry 91 and serialized on line 92 so that it can be sent by only one line, line 94, to the data formatter and timing controller 64. The frequency used to test every row and column line 98 and 96 for a returned pulse is approximately 1 MHz. The data formatter and timing controller 64 then determines the x and y coordinate position of the stylus based on the information received on lines 90 and 94 from the row and column drivers 68 and 66.

Power can be conserved by sending and receiving pulses on a subset of the row and column lines 96 and 98. For example, pulses may be sent across every other, or every third, row and column line 96 and 98. However, in high resolution applications, pulses should be sent through every row and column line 96 and 98.

The stylus used in the present invention may be a standard passive pen stylus or a standard active pen stylus. The determination of whether a passive or active stylus is used may be dependent on the row and column driver capability. Alternatively, the decision may be based on cost issues; the passive pen stylus is much less costly to manufacture. Furthermore, the application may dictate the optimal pen stylus architecture. For example, an active pen may be best for high resolution applications and a passive pen for lower resolution and typical consumer applications. The decision may also be based on environmental concerns such as EMI considerations related to the transmission of voltages between the stylus and the FED display.

In the present invention the pen stylus 20 can operate from either the anode or cathode side of the FED display. Since the structure of the anode and cathode is transparent, the row and column lines of the cathode are electrically accessible from either the anode or the cathode side of the display.

A standard passive pen stylus 20 will use passive components such as inductors and capacitors to receive pulses from the row and column lines 96 and 98 which are at a selected pixel intersection 100 closest to the stylus. The passive stylus then reflects the pulse back to the same row and column line intersection 100. The row and column line 96 and 98 at that intersection 100 will receive the reflected pulse from the pen stylus 20 and will then carry that pulse to the row and column receive circuitry 81 and 91. The row and column lines 96 and 98 which do not cross at the intersection 100 will propagate the pulse out from the row and column drivers 68 and 66, however, they will not send any reflected pulse to the row and column receive circuity 81 and 91. The row and column receive circuitry 81 and 91 then send the detected pulse information back to the data formatter and timing controller 64 for the determination of the x–y location of the pen stylus 20.

A standard active pen stylus 20 generates a voltage or current pulse which is detected by a row and column line 96 and 98 at a selected pixel intersection 100 which is closest to the pen stylus 20. The active pen stylus 20 can be powered by the FED display system through electrical lines which tether the pen to the system. However, the pen stylus 20 is preferably powered by a battery located within the pen. Placing a battery power source inside the pen gives the pen user greater freedom of pen movement. The pulse generated and transmitted by the pen stylus 20 is then carried by the row and column line 98 and 96 at intersection 100 to the row and column receive circuitry 81 and 91. The row and column receive circuitry 81 and 91 then send the detected pulse information back to the data formatter and timing controller 64 for the determination of the x–y location of the pen stylus 20. The data formatter and timing controller 64 may now use the x–y position information to implement such functions as performing the selected command or continuing the line being drawn. The data formatter and timing controller may also send the x–y position data to a host processor (not shown) for further processing by the host processor.

In another embodiment of the present invention, the pen stylus 20 may generate ultraviolet (UV) or laser light pulses. Row and column lines 96 and 98 would then convert the pulsed light into electrical signals which would be carried to the row and column receive circuity 81 and 91, as next discussed. In this embodiment, silicon photodiode material is added to the standard row and column metalization lines 96 and 98. Silicon photodiode material is high resistivity silicon. When light pulses contact the silicon photodiode which is biased by a voltage, hole pairs are created and the resistivity of the silicon at that location is reduced. Therefore the row and column lines 96 and 98 at that intersection 100 draw more current. The row and column receive circuitry 81 and 91 detect the current change in the row and column lines 96 and 98 comprising intersection 100 and send the detected information back to the data formatter and timing controller 64 for the determination of the x–y location of the pen stylus 20.

The FED pen system of the present invention may be used in a wide variety of situations. The pen stylus capability may be used for screen control applications such as selecting an icon or entering a command. In addition, pen stylus capability may be used for graphical data capture such as drawing pictures. Furthermore, pen stylus capability may be used for recording hand written notes, recording a signature, and for handwriting recognition.

Several other variations of the above would be understood by one skilled in the art and are considered to be within the scope of the present invention. For example, while the disclosure describes the data formatter and timing controller as processing the video data according to the VGA standard; other video resolutions and array sizes can be accommodated. Furthermore, while the disclosure describes a three-color display device, it is intended to include any color display generation scheme employing field emission technology.

The use of the FED pen system, as disclosed here, has numerous advantages. First, pen capability is provided utilizing existing FED components. Therefore, savings in power consumption, cost, and size are realized. The reduction in power which is realized in the present invention is important because pen-based applications are most often used in environments which are remote from power supply sources. Thus the FED system is usually powered by a battery during pen operation, and only through the conservation of power can the operating life of the system be extended.

In addition, the present invention provides the technical advantage of eliminating the problem of trying to accurately align the x–y locations of a pen stylus detector grid to the true x–y pixel locations of the FED display. The use of the row and column lines of the FED display as the detector grid ensures the accurate determination of the stylus x and y coordinates and is essential to today's high resolution applications.

While the principles of the present invention have been demonstrated with particular regard to the structures and methods disclosed herein, it will be recognized that various departures may be undertaken in the practice of the invention. The scope of the invention is not intended to be limited to the particular structures and methods disclosed herein, but should instead be gauged by the breadth of the claims which follow.

What is claimed is:

1. An electrographic system comprising:

a field emission device having a cathode coupled to an anode, row and column drivers coupled to said cathode and to a controller, and row and column lines respectively coupled to said row and column drivers;

receive circuitry coupled to said controller and said row and column lines; and a stylus coupled to said field emission device;

wherein said row and column drivers send a pulse on said row and column lines in response to an input signal from said controller, and said receive circuitry receives said pulse as affected by said stylus on said row and column lines.

2. The system in accordance with claim 1 wherein said stylus detects said pulse and outputs said affected pulse.

3. The system in accordance with claim 1 wherein said stylus comprises inductive and capacitive circuitry.

4. An electrographic system comprising:

a field emission device having a cathode coupled to an anode, row and column drivers coupled to said cathode and to a controller, and row and column lines respectively coupled to said row and column drivers;

receive circuitry coupled to said controller and said row and column lines; and a stylus coupled to said field emission device; said stylus outputing a pulsed light;

wherein said receive circuitry receives said pulse from said stylus on said row and column lines.

5. The system in accordance with claim 1 wherein said stylus outputs a voltage pulse.

6. The system in accordance with claim 1 wherein said stylus outputs a current pulse.

7. The system in accordance with claim 1 wherein said receive circuitry sends an output signal to said controller based on said output pulse.

8. The system in accordance with claim 7 wherein said controller determines the x–y location of said stylus based upon said output signal.

9. The system in accordance with claim 8 wherein said controller sends a video data signal to said row and column drivers in response to said determination.

10. The system in accordance with claim 1 wherein said pulses are sent by said row and column drivers and said affected pulse is received by said receive circuitry during the non-active time between each frame.

11. The system in accordance with claim 2 wherein said stylus transmits and receives said pulse from said anode side of said field emission device.

12. The system in accordance with claim 2 wherein said stylus transmits and receives said pulse from said cathode side of said field emission device.

13. The system in accordance with claim 8 wherein said controller sends a controller signal to a host processor in response to said determination.

14. The system in accordance with claim 4 wherein said row and column lines convert said pulsed light into an electric signal.

15. An electrographic apparatus comprising:

a field emission device having a cathode coupled to an anode, and row and column lines coupled to said cathode;

signal sending means coupled to said cathode for sending pulses to said row and column lines;

signal receiving means coupled to said cathode for receiving pulses from row and column drivers;

control means coupled to said signal sending means and said signal receiving means; and a stylus means moveable in adjacency about said field emission device for select interaction therewith to effect the derivation of position signals;

wherein said signal sending means sends said pulses on said row and column lines in response to an input signal from said control means, and said signal receiving means receives said pulses on said row and column lines.

16. The apparatus in accordance with claim 15 wherein said control means is responsive to said position signals for deriving a x-coordinate and a y-coordinate of said stylus means.

17. The apparatus in accordance with claim 15 wherein said stylus means detects said sending pulse and transmits said receiving pulse.

18. A method for generating coordinate signals in conjunction with a surface of a field emission device having a cathode coupled to an anode, row and column drivers coupled to said cathode and to a controller, and row and column lines respectively coupled to said row and column drivers, comprising the steps of:

providing pulses to said row and column lines;

receiving with receive circuitry from said row and column lines said pulses as affected by a stylus positioned proximate to selected said row and column lines; and determining an x-position and y-position of said stylus from said affected pulses.

19. A method for generating coordinate signals in conjunction with a surface of a field emission device having a cathode coupled to an anode, row and column drivers coupled to said cathode and to a controller, and row and column lines respectively coupled to said row and column drivers, comprising the steps of:

receiving with receive circuitry from said row and column lines pulses from a stylus positioned proximate to selected said row and column lines; and determining an x-position and y-position of said stylus from said pulses.

20. The method in accordance with claim 18 wherein said pulses from said stylus are current pulses.

21. The method in accordance with claim 18 wherein said pulses from said stylus are voltage pulses.

22. The method in accordance with claim 18 further including the step of sending said position data to a host processor.

23. The method in accordance with claim 18 further including the step of displaying a video image on said field emission display in response to said determination.

24. The method in accordance with claim 19 wherein said pulses from said stylus are light pulses.

25. The method in accordance with claim 24 further including the step of converting said light pulses into an electrical pulse.

26. An improved field emission device of the type which includes an anode plate having a phosphor coating on an electrically conductive film; a cathode plate having electron-emitting microtips and mutually orthogonal cathode electrodes and gate electrodes, each intersection of the electrodes defining a pixel; and facilities for periodically applying first electrical signals to the conductive film and the electrodes during active periods so that portions of the phosphor coating luminesce to create an image; wherein the improvement comprises:

circuitry for applying second electrical signals to the electrodes during the non-active periods following the periodic active periods;

a manipulable member capable of being located sufficiently close to the electrode intersections for affecting the second signals; and circuitry for receiving the member-affected second signals and for determining the position of the pen therefrom.

* * * * *